(12) United States Patent
Horoschenkoff et al.

(10) Patent No.: US 12,122,104 B2
(45) Date of Patent: Oct. 22, 2024

(54) METHOD FOR FORMING CONNECTIONS FROM A REINFORCING FIBER OR REINFORCING FIBERS, AND METHOD FOR PRODUCING A PRESSURE CONTAINER (71) Applicant: Bayerische Motoren Werke Aktiengesellschaft, Munich (DE)

(72) Inventors: Alexander Horoschenkoff, Taufkirchen (DE); Martin Huber, Truchtlaching (DE); Alexander Hupfeld, Erfurt (DE); Michael Ruf, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 177 days.

(21) Appl. No.: 17/927,590

(22) PCT Filed: May 20, 2021

(86) PCT No.: PCT/EP2021/063434
§ 371 (c)(1),
(2) Date: Nov. 23, 2022

(87) PCT Pub. No.: WO2021/239565
PCT Pub. Date: Dec. 2, 2021

(65) Prior Publication Data
US 2023/0202123 A1    Jun. 29, 2023

(30) Foreign Application Priority Data

May 26, 2020   (DE) ..................... 10 2020 113 996.9

(51) Int. Cl.
*B29C 70/24*     (2006.01)
*B29C 37/00*     (2006.01)
(Continued)

(52) U.S. Cl.
CPC .......... *B29C 70/24* (2013.01); *B29C 37/0082* (2013.01); *B29C 70/085* (2013.01);
(Continued)

(58) Field of Classification Search
CPC ....... B29C 70/24; B29C 70/10; B29C 70/085; B29C 70/205; B29C 37/0082;
(Continued)

(56) References Cited

U.S. PATENT DOCUMENTS 2,010,105 A * 8/1935 Perlesz ................ A47C 31/026
5/696
2,048,348 A * 7/1936 Mathewson ............. B68G 7/08
112/156
(Continued)

FOREIGN PATENT DOCUMENTS

DE              197 49 950 A1    5/1999
DE     10 2007 051 422 A1    4/2009
(Continued)

OTHER PUBLICATIONS

International Search Report (PCT/ISA/210) issued in PCT Application No. PCT/EP2021/063434 dated Sep. 13, 2021 with English translation (seven (7) pages).
(Continued)

*Primary Examiner* — Ismael Izaguirre
(74) *Attorney, Agent, or Firm* — Crowell & Moring LLP (57) ABSTRACT

A method is provided for forming connections from reinforcing fibers between faces of a wall for a pressure container. The reinforcing fibers are gripped by tufting needles and are pushed through the faces, and loops are formed through which support elements are introduced. A corresponding method produces a pressure container.

15 Claims, 4 Drawing Sheets

(51) Int. Cl.
*B29C 70/08* (2006.01)
*B29C 70/20* (2006.01)
*D05C 17/02* (2006.01)
*F17C 1/16* (2006.01)
*B29L 31/00* (2006.01)
*B32B 38/00* (2006.01)

(52) U.S. Cl.
CPC ............ *B29C 70/205* (2013.01); *D05C 17/02* (2013.01); *F17C 1/16* (2013.01); *B29L 2031/7156* (2013.01); *B32B 2038/008* (2013.01); *F17C 2201/0157* (2013.01); *F17C 2201/056* (2013.01); *F17C 2201/058* (2013.01); *F17C 2203/013* (2013.01); *F17C 2203/0604* (2013.01); *F17C 2203/0617* (2013.01); *F17C 2203/0619* (2013.01); *F17C 2203/066* (2013.01); *F17C 2203/0663* (2013.01); *F17C 2221/012* (2013.01); *F17C 2221/033* (2013.01); *F17C 2223/0123* (2013.01); *F17C 2223/0161* (2013.01); *F17C 2223/033* (2013.01); *F17C 2223/036* (2013.01); *F17C 2260/011* (2013.01)

(58) Field of Classification Search
CPC ..... B29L 2031/7156; B29L 2031/7154; B32B 2038/008; D05C 17/02; F17C 2201/0157; F17C 2201/056; F17C 2201/058; F17C 2203/013; F17C 2203/0604; F17C 2203/0617; F17C 2203/0619; F17C 2203/066; F17C 2203/0663; F17C 2221/012; F17C 2221/033; F17C 2223/0123; F17C 2223/0161; F17C 2223/033; F17C 2223/036; F17C 2260/011; F17C 2260/01; F17C 2260/00
See application file for complete search history.

(56) References Cited

U.S. PATENT DOCUMENTS

| | | | | |
|---|---|---|---|---|
| 4,917,756 | A | * | 4/1990 | Cahuzac ................ D04H 3/115 156/169 |
| 5,429,853 | A | * | 7/1995 | Darrieux ................. D04H 1/52 428/113 |
| 5,462,193 | A | * | 10/1995 | Schoo ...................... F17C 1/16 220/652 |
| 5,647,503 | A | | 7/1997 | Steele et al. |
| 6,051,089 | A | * | 4/2000 | Palmer ............. B29C 66/43461 156/303.1 |
| 6,314,899 | B1 | * | 11/2001 | Ballantyne ............. D05B 65/00 112/475.17 |
| 8,157,212 | B2 | * | 4/2012 | Bjornstad .......... B29D 99/0014 244/119 |
| 2006/0112865 | A1 | | 6/2006 | Weinberg et al. |
| 2010/0209658 | A1 | | 8/2010 | Roth |
| 2016/0069009 | A1 | | 3/2016 | Meer |

FOREIGN PATENT DOCUMENTS

| | | |
|---|---|---|
| DE | 10 2011 008 641 A1 | 7/2011 |
| DE | 10 2014 012 915 A1 | 3/2016 |
| DE | 10 2018 125 029 A1 | 4/2020 |
| JP | 2000-213692 A | 8/2000 |

OTHER PUBLICATIONS

German-language Written Opinion (PCT/ISA/237) issued in PCT Application No. PCT/EP2021/063434 dated Sep. 13, 2021 (six (6) pages).
German-language Search Report issued in German Application No. 10 2020 113 996.9 dated Jan. 18, 2021 with partial English translation (12 pages).

* cited by examiner

METHOD FOR FORMING CONNECTIONS FROM A REINFORCING FIBER OR REINFORCING FIBERS, AND METHOD FOR PRODUCING A PRESSURE CONTAINER

BACKGROUND AND SUMMARY

The technology disclosed here relates to a method for forming connections from a reinforcing fiber or reinforcing fibers between walls of a wall assembly for a pressure container. The technology disclosed here furthermore relates to a method for producing a pressure container.

Pressure containers are used, for example, in motor vehicles for storing gaseous fuel. The latter can be used for driving an energy converter such as a fuel cell, or a gas-operated internal combustion engine.

In the course of the more widespread use of gas-operated vehicles it is increasingly more important to utilize installation spaces in vehicles in order to accommodate therein pressure containers. However, herein lies the problem that pressure containers must also be able to actually withstand the pressure prevailing in the latter, this being not only a function of the wall thickness but also of the shape. A round cross section here is typically ideal in terms of the resistance to pressure, but often does not permit the efficient use of available installation spaces.

It is known in principle for connections from reinforcing fibers to be incorporated in pressure containers, so as to achieve adequate resistance to pressure even in shapes that deviate from a round cross section. Reinforcing fibers of this type can absorb the forces acting on wall assemblies and stabilize walls relative to one another. However, these reinforcing fibers are often difficult to incorporate.

It is a preferred object of the technology disclosed here to at least minimize or eliminate a disadvantage of a known solution, or to propose an alternative solution. It is in particular a preferred object of the technology disclosed here to propose a method by way of which the forming of connections from reinforcing fibers can be simplified. Further preferred objects may be derived from the advantageous effects of the technology disclosed here. The objects are achieved by the subject matter of the independent claim. The dependent claims represent preferred design embodiments.

The technology disclosed here relates to a method for forming connections from a reinforcing fiber or reinforcing fibers between walls of a wall assembly for a pressure container, the method comprising the following method steps which, for forming a connection or a row of connections between a first wall and a second wall of the wall assembly, are respectively repeated:

gripping each reinforcing fiber by a tufting needle at a gripping point of the reinforcing fiber from which a first portion and a second portion of the reinforcing fiber project;

penetrating the first wall with the tufting needle, then penetrating the second wall with the tufting needle such that the gripping point penetrates the first wall and the second wall, and the first portion and the second portion pass through the second wall and the first wall;

forming a loop between the gripping point and the second wall; and incorporating a supporting element into the loop.

By means of such a method, reinforcing fibers can be used in a very simple and reliable manner for forming connections in a pressure container. In the process, a tufting needle grips the respective reinforcing fiber at the gripping point from where the first portion and the second portion of the reinforcing fiber project. This may also be interpreted such that the gripping point divides the reinforcing fiber into the portions, wherein the two portions project so as to proceed from the gripping point. When the tufting needle penetrates the first wall, the reinforcing fiber is typically entrained at the gripping point. If the tufting needle has penetrated the first wall, the gripping point has thus also penetrated the wall. The two portions of the reinforcing fiber then project from the tufting needle in such a manner that the two portions pass through a hole formed through the first wall. The same moreover also applies to the second wall which is penetrated in a further, typically linear, movement of the tufting needle. When viewed from the gripping point, the portions then first pass through the second wall and then through the first wall.

If the reinforcing fiber during the procedure is pulled through only on one side or unevenly, the gripping point is displaced along the reinforcing fiber during the movement of the tufting needle. The gripping point is typically understood to be that point on the reinforcing fiber at which the tufting needle grips the reinforcing fiber and can thus manipulate the latter, for example because the reinforcing fiber at the gripping point passes through an eyelet of the tufting needle, or is gripped in another way. The portions project in each case from the gripping point. When viewed along the reinforcing fiber, these portions may likewise be variable.

If a tufting needle is mentioned in the context of the method management, this typically refers to a respective tufting needle which processes one of the reinforcing fibers. If a plurality of reinforcing fibers are simultaneously processed, the process management is typically performed using one tufting needle per reinforcing fiber.

The loop can in particular provide the space required for the supporting element. The loop is in particular formed in a respective reinforcing fiber. Once the supporting element has been incorporated into the loop, the reinforcing fiber that has just been incorporated can no longer be pulled through the second wall. The tufting result is thus maintained, specifically in that the first portion and the second portion of the reinforcing fiber now extend between the two walls and in this way can later serve as a connection which can absorb the forces that act on the walls.

This makes it possible, for example, for the two walls to be of a planar embodiment, this being an embodiment which for receiving internal pressure is fundamentally less stable than round walls. However, the connections can absorb forces acting thereon and stabilize the walls relative to one another. As a result, lesser wall thicknesses can be used than would be required without such connections, for example.

A connection can be understood to mean in particular a portion, or a combination of a plurality of portions, of a reinforcing fiber that runs or run between two walls of a wall assembly and stabilizes or stabilize the walls relative to one another. The connection typically runs in the interior of a pressure container.

A reinforcing fiber is typically an elongate fiber which has a specific tensile strength and can absorb forces. A tufting needle is, for example, an elongate needle having a tip which may have an eyelet or a region with a furcation for gripping the reinforcing fiber.

The wall assembly typically encloses an interior space in which gaseous fuel can be stored in the finished pressure container. The walls are in particular a component part of this wall assembly, wherein the wall assembly may also have further component parts, for example curved portions, which connect the walls to one another.

A row of connections can be understood to mean in particular a plurality of parallel connections, for example connections which are disposed directly next to one another and/or along a line. It is a particular advantage of the technology disclosed here that a plurality of tufting needles, or else a multiplicity of tufting needles, which can in particular be conjointly moved can be used. To this end, the tufting needles can in particular be assembled on a common support device or a guide, respectively. This permits production in parallel, which is particularly efficient.

A supporting element can in particular be a stable element which, after being incorporated into the loop, prevents that the reinforcing fiber is pulled through the walls again. In the finished state, the supporting element can in particular also ensure a suitable distribution of force. A supporting element can in particular be a body having a longitudinal direction and, transversely to the longitudinal direction, having a constant cross section. Potential embodiments will yet be discussed further below.

The first wall can in particular be parallel to the second wall. This enables, for example, the adaptation to flat installation spaces, or in more general terms, to installation spaces having a shape that is configured so as to be complementary to the wall assembly.

The wall assembly can in particular be composed of wound carbon fiber tiers. The latter have proven successful for the production of pressure containers. The carbon fiber tiers can in particular be wound in a separate winding process such that the reinforcing fibers can then be incorporated into the wall assembly formed in the process. Subsequently, the wall assembly can be soaked with a matrix, for example, or be covered with the latter, in order to establish strength and/or gas tightness. The final state of the wall assembly, which initially may particularly only comprise the fibers mentioned, can be established in the process. This final state can be, for example, that of a fiber-reinforced layer in which the wall assembly formed from fibers is embedded in the matrix, thus reinforcing the latter. Wound carbon fiber tiers have the particular advantage that these wound carbon fiber tiers, when penetrated by the tufting needle, can readily release a small opening for this purpose. Such an opening can be created in particular in that adjacent carbon fibers are slightly pushed to the side. The use of fibers other than carbon fibers is also possible. Instead of a matrix being subsequently applied, fibers which are covered with matrix material can also be used for the wall assembly, for example.

The reinforcing fibers can in particular be formed from aramid or carbon fibers. Materials of this type have proven successful for typical applications. However, the use of other materials is also possible.

A plurality of tufting needles can in particular be simultaneously moved. This can take place, for example, by attaching the tufting needles to a common guide. This enables a very efficient production because many tufting needles can be moved simultaneously. A simultaneous movement is to be understood to mean in particular a movement of the same type and at the same time. In other words, the tufting needles simultaneously perform the same movements.

When a reinforcing fiber by way of which a specific method step is carried out, for example, or which has a specific property, is mentioned in the context of the method, in the case where a plurality of connections are simultaneously formed along a row this typically means that the method step is carried out with each reinforcing fiber, or that each reinforcing fiber has the property.

While the walls are penetrated by the tufting needle, the reinforcing fiber is preferably resupplied or unwound from a supply installation. Such a supply installation can be, for example, a package. During tufting, a portion is typically fixed, either directly by anchoring or fastening, for example on or in the wall assembly or a matrix, respectively, this potentially being the case in particular at an end-proximal location of the reinforcing fiber, or there is a connection from which the reinforcing fiber extends and which typically is tightened when tufting the next connection already situated next to this portion. Once the first portion has been correspondingly fastened, the second portion can in particular be resupplied from a supply installation. This can in particular take place in a self-acting manner in that during tufting there is tension acting on the second portion by way of the tufting needle and this second portion is therefore unwound from a supply installation such as, for example a package. An active feed is however also possible.

The loop can in particular be formed by retracting the tufting needle. As a result, the tension acting on the reinforcing fiber can be relaxed, and the loop is formed owing to the friction by way of which the reinforcing fiber is held in the wall assembly. The retraction for forming the loop can in particular take place in a direction that is counter to the direction in which the reinforcing fibers are inserted.

The method can in particular be carried out in such a manner that the tufting needle, when being retracted for forming the loop, is retracted only so far that the tufting needle only just penetrates the second wall, i.e. in particular that a longitudinal end of the reinforcing fiber does not yet pass through the second wall. It is avoided as a result that the reinforcing fiber, instead of forming a loop, passes through the second wall assembly.

An eyelet can in particular be formed in each tufting needle. This eyelet can be disposed, for example, so as to be directly adjacent to a tip, or an acute tapered portion of the tufting needle, respectively. The reinforcing fiber which is to be inserted by means of the tufting needle can in particular run through the respective eyelet and at least substantially remain in the latter during the method described here. This can in particular be understood to be the meaning of gripping the reinforcing fiber. The tufting needle can in this way guide the reinforcing fiber and entrain the reinforcing fiber through the walls, for example. Once the supporting element has been guided through the loop, the reinforcing fiber is prevented from being completely or largely retracted conjointly with the eyelet. Far rather, the reinforcing fiber typically runs through the eyelet when the tufting needle is being retracted.

Alternatively, a fork-type longitudinal end of the tufting needle can also be used for gripping the reinforcing fiber, for example.

In more general terms, gripping can be understood to mean a connection between the tufting needle and the reinforcing fiber, which enables the tufting needle to manipulate the reinforcing fiber, for example as has been mentioned, entraining the reinforcing fiber while penetrating the walls and in this way forming a connection. The gripping can remain constant across a plurality of connections to be formed, for example when using an eyelet, or else be newly established every time, for example when using a fork-type longitudinal end.

Only one supporting element is preferably incorporated into all loops of a row. Particularly efficient manufacturing can be achieved as a result. However, the use of a plurality of supporting elements is also possible.

The supporting element can in particular have a curved deflection face for deflecting the reinforcing fiber or the reinforcing fibers. As a result, reinforcing fibers can be guided along the deflection face about the supporting element, and forces can be introduced into the reinforcing fiber or the reinforcing fibers along this deflection face. The deflection face can in particular have a semicircular cross section. The deflection face can in particular form a curved portion of the supporting element.

The supporting element can also have an acute tapered portion for supplying the portions to the second wall. This acute tapered portion can in particular be directly adjacent to the deflection face and can ensure that the reinforcing fiber is guided in a defined manner, from the greatest expansion of the latter on the deflection face to the particularly narrow passage through the second wall. The acute tapered portion, at the location closest to the wall assembly, can in particular have a tip, or a smallest width in the cross section, respectively.

The reinforcing fiber, upon incorporation of the supporting element, can in particular be tensioned by pulling on the second portion. As a result, the supporting element is tightened and the connection between the walls is also tensioned such that the connection is prepared for the later absorption of forces. The pulling on the second portion can in particular take place in the context of the next tufting procedure for forming the next connection.

The second portion, when forming the next connection, can in particular represent the first portion. In other words, a connection is first formed by tufting, wherein the first portion is typically fastened and the second portion trails behind. This second portion is now considered to be the first portion for a subsequent tufting procedure in which a further connection is formed, or the second portion transitions to such a first portion.

A further supporting element, which bears on the outside of the first wall and deflects the reinforcing fiber or the reinforcing fibers, can in particular be incorporated between two connections of a reinforcing fiber. This further supporting element can in particular deflect all reinforcing fibers. In this way, a defined deflection of the reinforcing fibers can be achieved, like on the other side, and forces from the wall can be introduced into the respective reinforcing fiber.

The further supporting element can in particular have a planar bearing face for bearing on the first wall. In this way, forces can advantageously be introduced into the further supporting element, the latter then transmitting the forces to the reinforcing fiber. The further supporting element can also have a curved deflection face for deflecting the reinforcing fibers. The further supporting element can in particular deflect all reinforcing fibers and can be disposed between two rows of connections.

The supporting elements can in particular be formed from a metallic material. This has proven advantageous for typical applications. However, other materials such as, for example, a plastics material, are also possible.

The supporting elements can in particular be disposed outside the wall assembly.

According to one embodiment, a core, which is subsequently removed, can be in the wall assembly during the method. This corresponds to a method management using a lost core. To this end, the core can be formed from a material which can be rinsed out, blown out or suctioned, for example. To this end, the core can be formed from, for example, a wax, a thermoplastics material, or a soluble material, in particular water-soluble or acid-/base-soluble material. The removal of the core can in particular take place upon incorporation of all the reinforcing fibers.

According to one embodiment, a core, which in the finished pressure container remains in the wall assembly, can be in the wall assembly during the method. This core is thus not removed but remains in the pressure container even after the latter has been completed. In the finished container, the core can assume the task of a liner, for example, thus suppress the permeation of stored gas.

The core can be pressurized during the method, for example, or during parts of the method. To this end, a pressure, for example a gas pressure, in an interior space of the core can in particular be increased. The stability can be enhanced as a result.

The connections can in particular have mutual spacings of at most 5 mm. This has proven advantageous for typical embodiments, in order to ideally introduce arising forces into the reinforcing fibers and to support the walls relative to one another. In principle however, larger spacings can also be used. The spacings can in particular be measured along a row and/or transversely thereto along directly adjacent connections of a reinforcing fiber.

The technology disclosed here furthermore relates to a method for producing a pressure container, the method comprising the following steps:
  providing a wall assembly;
  forming connections between walls of the wall assembly
    by means of a method disclosed herein; and
  attaching a matrix material which surrounds the wall
    assembly.

This enables a particularly efficient production of a pressure container having internally formed connections for supporting the walls. In terms of the method for forming connections, reference can be made to all embodiments described herein.

Furthermore, a step of incorporating a liner material can in particular be provided, the liner material bearing in particular on the inside of the wall assembly, sealing the container and/or serving as permeation barrier for hydrogen.

The matrix, or the matrix material, respectively, can in particular be formed from epoxy resin or cast polyamide. The matrix, or the matrix material, respectively, serves in particular for stabilizing and protecting the wall assembly of the pressure container. Depending on the embodiment, the matrix, or the matrix material, respectively, can also ensure the tightness in relation to gas, in particular in the absence of a liner being used. In particular when a thermoplastics matrix is used, it can be provided in particular that a liner, should the latter be present, is composed of the same material as the matrix. In this way, a materially integral connection between the liner and the external wall can be achieved.

End regions of the reinforcing fiber or of the reinforcing fibers can preferably be fastened in the matrix material. These here can in particular be regions or portions, respectively, which are directly adjacent to free longitudinal ends. For fastening, the end regions can be embedded or fastened using special fastening means. The end regions can also be fixed in a force-fitting, form-fitting or materially integral manner. For example, two ends can be knotted to one another, this representing a force-fitting connection, or adhesive bonding of the ends in the matrix material of the external wall can take place, this representing a materially integral connection. The fastening ensures that the reinforcing fibers do not fray at the end points of the latter.

Edges of the wall assembly can in particular be embodied so as to be rounded. This enables a positive distribution of the pressure on the edges. Walls, between which the connections are formed, can in particular be embodied so as to be mutually parallel.

Corners of the wall assembly can also be embodied so as to be rounded. For example, inserts, e.g. fiber patches, can be included during winding for this purpose.

For example, when corners of the wall assembly, or of the pressure container, respectively, are not reproduced, or reproduced only to a limited extent, by additional wound tiers, additional elements can be used on corners, for example inserts of fiber-composite tiers which are in particular disposed between the wound fibers or fiber composite tiers, respectively, or inserts from metal which are in particular disposed in the corners or corner regions between the fibers, or fiber composite tiers, respectively, and a liner.

A wall assembly which is surrounded by a matrix material can in particular form an external wall of a finished pressure container. In terms of the external wall, reference may in this instance be made to a fiber-reinforced material.

The technology disclosed herein furthermore relates to a pressure container which has been produced by means of a method disclosed herein and according to one or a plurality of potential embodiments.

A pressure container which has been produced according to the method disclosed here can in particular be used for a motor vehicle (e.g. passenger motor vehicles, motorcycles, commercial vehicles). The pressure container produced according to the method disclosed here serves in particular for storing fuel which is gaseous under ambient conditions. The pressure container can be used, for example, in a motor vehicle which is operated with compressed natural gas (also referred to as CNG) or liquefied natural gas (also referred to as LNG) or with hydrogen. The pressure container is typically fluidically connected to at least one energy converter which is specified for converting the chemical energy of the fuel into other forms of energy.

The pressure container can in particular be embodied as a composite overwrapped pressure vessel. The pressure container can be, for example, a cryogenic pressure container or a high-pressure gas container.

High-pressure gas containers are configured for permanently storing fuel at ambient temperatures at a nominal operating pressure (also referred to as NWP) of at least 350 bar gauge pressure (positive pressure in relation to the atmospheric pressure) or at least 700 bar gauge pressure. A cryogenic pressure container is suitable for storing the fuel at the aforementioned operating pressures even at temperatures which are significantly below the operating temperature of the motor vehicle.

As has already been mentioned, the pressure container can comprise a liner. The liner forms the cavity in which the fuel is stored. The liner can be produced from, for example, aluminum or steel, or from alloys thereof. Furthermore preferably, the liner can be produced from a plastics material. However, a liner-less pressure container may likewise be provided.

The finished pressure container can comprise in particular a fiber-reinforced layer. The fiber-reinforced layer can surround a liner at least in regions, preferably completely surround a liner. The fiber-reinforced layer is often also referred to as a laminate or a casing or armor, respectively. Fiber-reinforced plastics materials, for example carbon fiber-reinforced plastics materials and/or glass fiber-reinforced plastics materials, are typically used as a fiber-reinforced layer. The fiber-reinforced layer expediently comprises reinforcing fibers which are embedded in a plastics-material matrix. The matrix material, the type and proportion of reinforcing fibers and the orientation of the latter can in particular vary in order for the desired mechanical and/or chemical properties to be obtained. The fiber-reinforced layer typically has a plurality of layered tiers. The fiber-reinforced layer can in particular be formed, as has been described further above, in that fibers are formed in the shape of a wall assembly and a matrix material is thereafter applied. An external wall of the pressure container can be formed in the process.

A valve which can be used for filling and/or retrieval can in particular be incorporated in the pressure container. A plurality of valves can also be incorporated. A lost core can also be removed by way of valves of this type, for example.

It is to be mentioned in general that in order to reduce costs for future fuel cell electric vehicles (FCEVs) it is attempted across all manufacturers to develop common vehicle architectures for battery electric vehicles (BEVs) and fuel cell electric vehicles (FCEVs). This means, inter alia, that identical or at least very similar installation spaces are to be utilized for integrating the drivetrain components for the different variants of propulsion. With a view to the energy store, high-voltage batteries in BEVs nowadays are in most instances integrated in flat and approximately cuboid installation spaces in the vehicle floor pan. In terms of utilizing the same vehicle architecture for BEVs and FCEVs this means that the hitherto conventional cylindrical hydrogen pressure containers of carbon fiber-reinforced plastics material (CFRP) with large diameters have to be geometrically adapted in order to be able to be integrated into the existing installation spaces for high-voltage batteries. In order to meet customer requirements in terms of the vehicle range per tank filling, the available cuboid installation space should be utilized in an ideally efficient manner for storing the gaseous hydrogen or other fuel in pressure containers. Pressure containers with a rectangular cross section, which in the interior of the container are provided with ties, represent a particularly efficient solution. The ties, also referred to as connections, here ensure that mutually opposite planar faces maintain their planar shape and do not bulge even under stress by high internal pressure.

An exemplary external geometry of a pressure container for storing gaseous fuels up to a nominal operating pressure of, for example, 70 MPa can proceed from a cuboid, for example, the edges and corners of the latter on the small lateral faces being rounded. The large mutually opposite faces (upper side and lower side) are not rounded, for example, and lie so as to be mutually parallel. An external wall of the pressure container is composed of wound carbon fiber tiers, for example. The planar regions of the external wall can be held together by ties or connections, respectively, so as to avoid any deformation as a result of the internal pressure. Aramid fibers and carbon fibers above all can be considered as a material for the ties. Supporting elements, which serve for deflecting the tie, on the one hand, and for the planar transmission of forces from the tie to the tank wall on the other hand, can be used for the transmission of the forces from the tie into the tank walls. The supporting elements in the cross section have a semicircular shape, for example. The supporting elements are preferably specified such that the supporting elements can absorb high compressive forces; metallic materials are preferably used. In this way, forces which result from the stress by internal pressure are absorbed in the z-direction by the ties, for example, and in the x-direction and y-direction are absorbed by the external wall. A liner which prevents or reduces the permeation of the hydrogen or of another gas through the pressure container wall can bear on the internal side of the external wall of the pressure container, should an external wall soaked with a matrix material not meet the requirements in terms of permeation. Epoxy resins or cast polyamides can be considered as materials for the matrix of the external wall, for example. In the case of a thermoplastics matrix, it is expedient for the liner to be composed of the same material in order to obtain a materially integral connection between the liner and the external wall. The use of dissimilar materials is however also possible. Additionally, a valve, which enables the filling and the retrieval of hydrogen or another gas, is preferably incorporated in the pressure container.

Should the corners of the pressure container not be reproduced, or be reproduced only to a limited extent, by additional wound ties, additional elements are preferably incorporated at these locations. The following elements can be used here, for example:

- inserts from fiber-composite tiers which are disposed in the corner region, in particular between the wound fiber-composite tiers;
- inserts from metal which, in the corner regions, are attached in particular between the fiber-composite tiers and the liner.

A fundamental distinction is made between two exemplary deflection variants for attaching the ties, here also referred to as connections or reinforcing fibers, to a wall. A first variant shows a loop which is formed by two stitches. The loop is formed by way of two lead-throughs which penetrate the fiber tiers and the optional liner. The loop lies taut on the supporting element which in the cross section has a semicircular shape. A second variant provides that there is only one lead-through going through the fiber tiers and the optional liner in order for the loop to be formed. The lead-through is preferably generated by an incision using a sewing needle or a tufting needle, respectively. The semicircular supporting element here is additionally equipped with a second supporting element below the former, the second supporting element achieving a sufficient height for forming the loop and thus guaranteeing improved guiding of the tie toward the penetrating hole of the external wall. It is avoided as a result that the tie is damaged by a potential sharp edge of the deflection element.

The following requirements are set for the supporting elements, for example:

- directed deflection of the ties in order to avoid any constriction in the external wall;
- planar introduction of force of the tie tensile forces into the external wall;
- contribution toward maintaining the spacing of the ties.

Spacings of more than 5 mm between the ties in many embodiments are less suitable for the chosen construction mode because excessively high forces would be transmitted into the external wall by each tie in this instance. This would lead to a high shear load in the external wall. Since the external wall is composed of a laminate, for example, which is composed of the various fibrous windings, the external wall is not suitable for absorbing high shear loads. Consequently, tie spacings of less than 5 mm are pursued, for example. However, larger spacings are also possible in other embodiments.

In order for the tank, or the pressure container, to be produced, a wall assembly for an external wall is constructed in the first step, for example. Since the external wall is created by winding fibers, for example, a winding core which reproduces the internal contour of the external skin is required. Two production methods which differ substantially in terms of the chosen winding core are described hereunder. The attachment of ties is separately described thereafter.

Production Method A—Using a Lost Core from a Soluble/Fusible Material

The core variant A provides a winding core which is required only for the production method of the pressure container and is subsequently removed. For different winding directions, the winding core can be turned in the clamping mechanism of the latter. The production of the core can take place, for example, by a casting process or a 3D printing method. Waxes or thermoplastics materials which have a low melting point and subsequently can be removed by melting with minor heating are considered as materials, for example. Furthermore, soluble materials, such as, for example, water-soluble materials or materials which can be decomposed/dissolved by an acid/base solution, such as, sand cores or (water-) soluble synthetic materials, are expedient. The geometry of the core reproduces the internal contour of the external skin, on the one hand. The core advantageously likewise has a perforated pattern which serves for the construction of the ties. The cross section of the holes can be adapted to the geometry of the tool which is required for attaching the ties. For example round or quadrangular. The perforated pattern can likewise serve as a tool guide. Once the ties have been attached (explained in detail separately), the wound fibers that reproduce the external skin of the pressure container, and the fibers that form the ties optionally are soaked. This can take place, for example, by vacuum infiltration or pressure-assisted injection of the resin in a resin transfer molding process. The use of pre-impregnated fibers represents another possibility. Epoxy resins and thermoplastics materials can be considered as matrix materials, for example. The core prevents in each case that the later usable volume of the pressure container is filled with resin.

Once the matrix material has been introduced, the core can be removed by a filling and retrieval valve. The retrieval of the core material can be accelerated, for example, by air being guided into the interior of the pressure container via a bypass. Depending on whether the external wall and the attachment of the ties thereto meet the desired requirements of impermeability and permeation, a liner can subsequently be introduced, for example by a method similar to centrifugal casting. A cast polyamide can be a preferred material for the liner.

Production Method B—Core which after Winding Remains in the Component and Simultaneously Assumes the Function of the Liner The core variant B provides a winding core which facilitates the production process of the pressure container as well as assumes the function of the liner in the later pressure container. The upper side and the lower side of the core here are connected by tubular cavities through which the ties run. A 3D printing method is preferably used as the production method for the core. A polymer material, if possible a thermoplastics material, is preferably chosen as the material for the liner. If the matrix material of the external skin is likewise a thermoplastics material, the same material is chosen for the core, for example, as a result of which a materially integral connection between the external skin and the core can be implemented. The application of the wound tiers, the attachment of the ties or connections, respectively, and the soaking of the fibers take place in a manner analogous to that of the production method A. For the soaking of the fibers, the winding core, in order to remain dimensionally stable, can additionally be filled with a pressurized medium by way of the filling and retrieval valve, should the matrix material be applied by means of positive pressure.

Tufting Process for Attaching the Ties

The ties, or connections, respectively, of the pressure container are formed by high-tensile fibers, preferably aramid or carbon fibers, for example. Here, one fiber strand is advantageously used for a plurality of ties in that the fiber strand is deflected outside the external walls. Accordingly, the incorporation of the ties is based on a sewing or tufting process.

In order to be able to carry out the tufting process while simultaneously using a plurality of needles, the tufting needles are fastened to a rail or mounting, respectively, for example. When moving the rail in the negative z-direction, all needles are first guided through the fiber tiers of the external wall on the upper side, then through the perforated pattern of the core, and subsequently through the fiber tiers of the external wall on the lower side. The loops, which are characteristic of the tufting process, are formed when the needles are being retracted. This is achieved in that, for example, the tufting needles have corresponding grooves in which the fiber runs and during retraction is clamped on one side. Owing to the multiplicity of the needles used, a loop tunnel is created, the supporting element on the lower side being able to be pushed through the loop tunnel. The needles are now completely withdrawn from the fiber tiers, and the supporting element by means of a fiber tensioning system is now pulled onto the external wall of the lower side. The fiber tensioning system is composed of a fiber lead-through in which, depending on the position of the tensioning lever, the individual fibers of the tufting needles can be relatively easily pulled through or blocked. During the incision of the tufting needle, the fibers can thus easily slide along and the loops, upon retraction of the needles, can be tightened by way of the blocked tensioning system. The tufting needle is subsequently removed from the winding core again in the positive z-direction and the thread is tautened so as to ensure that the deflection element sits firmly on the lower side. The winding body is subsequently displaced in the negative y-direction, and a further supporting element for the deflection of the tie fibers can be inserted. A further deflection on the upper side is created by repeating the procedure. It is to be mentioned in particular that a plurality of tufting actions can be carried out in parallel (in particular in the x-direction) such that the entire tufting procedure for completing the pressure container reflects a continuous process which is subjected to a continuously cycled advancing movement in the negative y-direction. Accordingly, the embodiment of the loop deflection on the upper side and the lower side differs above all during the tufting process.

The technology disclosed here will now be described by means of the figures.

DETAILED DESCRIPTION OF THE DRAWINGS

Figure 1:
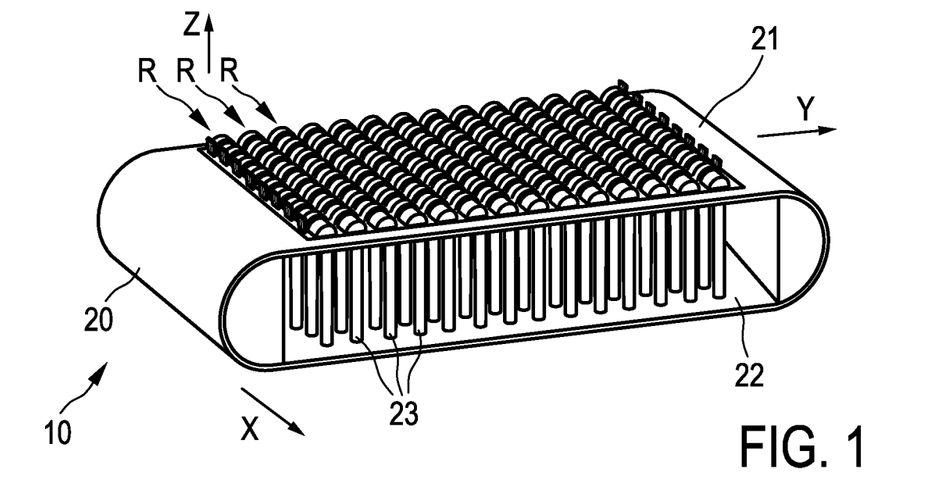
FIG. 1 shows a fragment from a pressure container.

FIG. 1 in a purely schematic manner shows a fragment from a pressure container 10, wherein the latter has not yet been fully completed and is furthermore cut open so that components in the interior of the pressure container 10 can also be seen.

Shown in FIG. 1 is also a typical coordinate system of such a pressure container 10, showing an x-direction, a y-direction and z-direction. The x-direction and the y-direction typically define a plane which, for example in a typical installed state in a motor vehicle, may be horizontal. For example, such a plane can be parallel to a floor panel of the motor vehicle. The z-axis is typically a vertical direction. However, it is to be pointed out that the pressure container 10 can also be installed in an entirely different manner in a motor vehicle or in any other unit, in particular so as to be completely independent of a potential alignment during the production of the pressure container 10.

The pressure container 10 has a wall assembly 20. The wall assembly 20 externally surrounds the pressure container. The wall assembly 20 is formed from wound fibers, this not being illustrated in FIG. 1. When a matrix is later applied to the wall assembly 20, this forms a fiber-reinforced layer which can represent an external wall of the pressure container 10 in the finished state.

The wall assembly 20 has in particular a first wall 21 and a second wall 22. When viewed along the z-direction, the first wall 21 is disposed on the upper side and the second wall 22 is disposed on the lower side. The walls 21, 22 here are mutually parallel and are in particular inherently planar. In principle, this leads to a pressurized gas stored in the pressure container 10 exerting on the first wall 21 and the second wall 22 a pressure which is higher in comparison to a round wall assembly. In principle, this could be compensated for by a greater wall thickness, this however often being undesirable.

In order to compensate for the higher pressure, a plurality of connections 23 from reinforcing fibers are disposed in the pressure container 10, the connections 23 running between the first wall 21 and the second wall 22, as shown. The connections 23 here extend transversely to the first wall 21 and to the second wall 22. The connections 23 thus connect the two walls 21, 22 to one another at many locations, as a result of which the first wall 21 and the second wall 22 mutually support one another. This leads to the walls 21, 22 being able to absorb a high pressure even at a significantly lesser wall thickness than otherwise required, and damage to the wall assembly 20 being avoided.

The connections 23, as shown, are disposed along a plurality of rows R. The connections 23 of a respective row R here run so as to be mutually parallel and are formed next to one another along a distance. This enables a particularly efficient production, the latter being discussed in more detail hereunder. The connections 23 here are formed from a plurality of continuous reinforcing fibers, wherein each reinforcing fiber forms connections of a plurality of rows R. Each reinforcing fiber here runs fundamentally along the y-direction, i.e. each reinforcing fiber forming a plurality of connections 23 disposed successively in the y-direction.

The respective reinforcing fibers on the upper side as well as on the lower side are suitably deflected in order to be more readily producible, and preferably to be able to absorb forces and introduce the latter into the connections 23. This will be described hereunder with reference to FIGS. 2 and 3.

Figure 2:
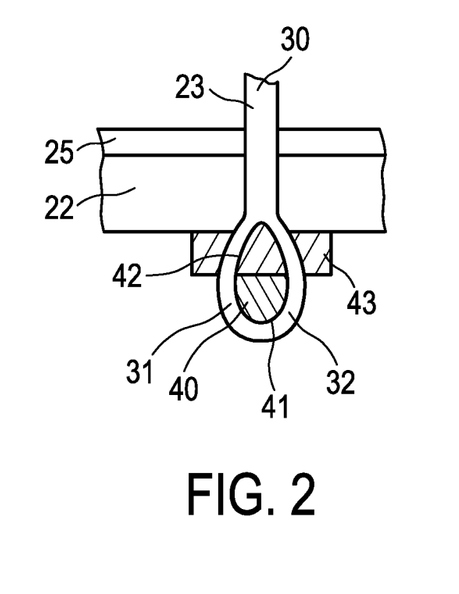
FIG. 2 shows a first type of a deflection.

FIG. 2 shows a deflection which can in particular be used on the lower side on the second wall 22. Likewise to be seen here is a reinforcing fiber 30 which first passes through the second wall 22 and is then deflected by a supporting element 40. The supporting element 40 has a curved deflection face 41 and furthermore an acute tapered portion 42. The supporting element 40 has a constant cross section and extends along the x-direction. The supporting element 40 in the cross section thus overall has a teardrop shape.

In the deflection shown in FIG. 2, the reinforcing fiber 30 is divided into a first portion 31 and a second portion 32. The border between the two portions 31, 32 here runs on the point that is the most distant from the second wall 22, thus in other words on the lowest point of the curved deflection face 41. A further support 43, which laterally stabilizes the reinforcing fiber 30, is disposed so as to be lateral to the loop formed in such a manner.

The two portions 31, 32 above the supporting element 40 in FIG. 2 converge so far that the two portions 31, 32 form a connection 23. Therefore, the two portions 31, 32 are no longer separately illustrated.

A schematically illustrated liner 25, which prevents the diffusion of gas, is formed on the inside of the second wall 22.

Figure 3:
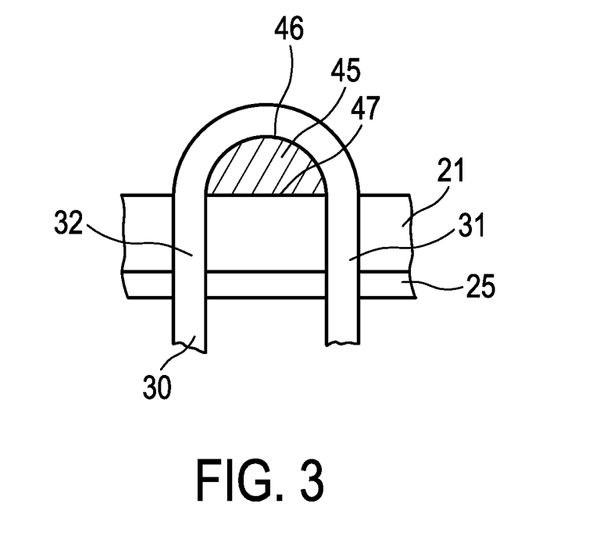
FIG. 3 shows a second type of a deflection.

FIG. 3 shows a deflection such as typically takes place on the upper side, thus above the first wall 21. To be seen here is a deflected reinforcing fiber 30 which is divided into a first portion 31 and a second portion 32. It is to be mentioned that the designation of such portions here depends on the respective location and may vary in particular during a production method, this being discussed in more detail hereunder.

A further supporting element 45 is provided for deflecting the reinforcing fiber 30. This further supporting element 45 has a semicircular cross section and extends along the x-direction, wherein a respective further support element 45 is provided for each row R. The further supporting element 45, as shown, in the cross section has a further curved deflection face 46 which is preferably embodied so as to be semicircular, and a planar bearing face 47. The further supporting element by way of the planar bearing face 47 bears on the first wall 21. In contrast, the further curved deflection face 46 serves for deflecting the reinforcing fiber 30 along a semicircle.

As shown, the reinforcing fiber 30 on the left side as well as on the right side of the further supporting element 45 penetrates the first wall 31. The schematically illustrated liner 25, which prevents a diffusion of gas, is also formed on the inside of the first wall 21.

As a result of the embodiment shown, a force which is exerted on the first wall 21 from the inside and is created by a high internal pressure in the pressure container 10, is ideally also introduced into the reinforcing fiber 30. If the latter is connected to the second wall 22 in a similar manner on the other side, the reinforcing fiber 30 thus enables that the two walls 21, 22 support one another.

In the embodiment of the deflection of FIG. 3 shown, the second portion 32 is typically associated with a connection 23, and the first portion 31 is associated with a further connection 23 which from the first-mentioned connection 23 can have a spacing of, for example, 5 mm or else another spacing. The further supporting element 45 can ensure the corresponding spacing, for example.

Figure 4:
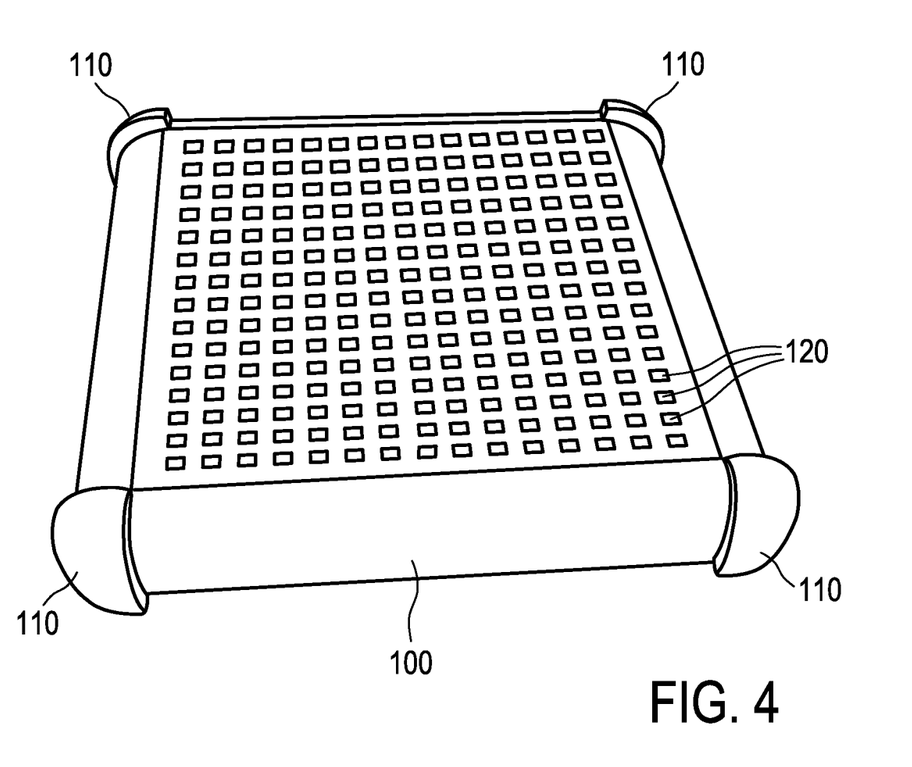
FIG. 4 shows a core.

FIG. 4 shows a potential embodiment of a core which can be used in the context of a production of a pressure container. The core 100 here at least roughly has the shape that the pressure container 10 is to have in the final configuration thereof. Fibers can in particular be wound about the core 100, wherein the core 100 defines the shape for this purpose.

The core 100 has a total of four projecting corners 110 which facilitate the configuration of the corners in the x-y plane. Furthermore, the core 100 has a multiplicity of passages 120 which extend along the z-direction. The passages 120 define the position and the alignment of the connections 23 while the latter are being formed.

The embodiment of FIG. 4 is a core 100 which is configured as a lost core. This means that the core 100 is composed of a material which during the production process indeed ensures the necessary stability but thereafter can be blown out or suctioned such that the core 100 is no longer present in the final pressure container 10. Once the core 100 has been suctioned, a liner can be formed in that, for example, a material provided for this purpose is incorporated into the pressure container 10, and the pressure container 10 then is suitably moved so that the liner wets the entire internal surface.

Figure 5:
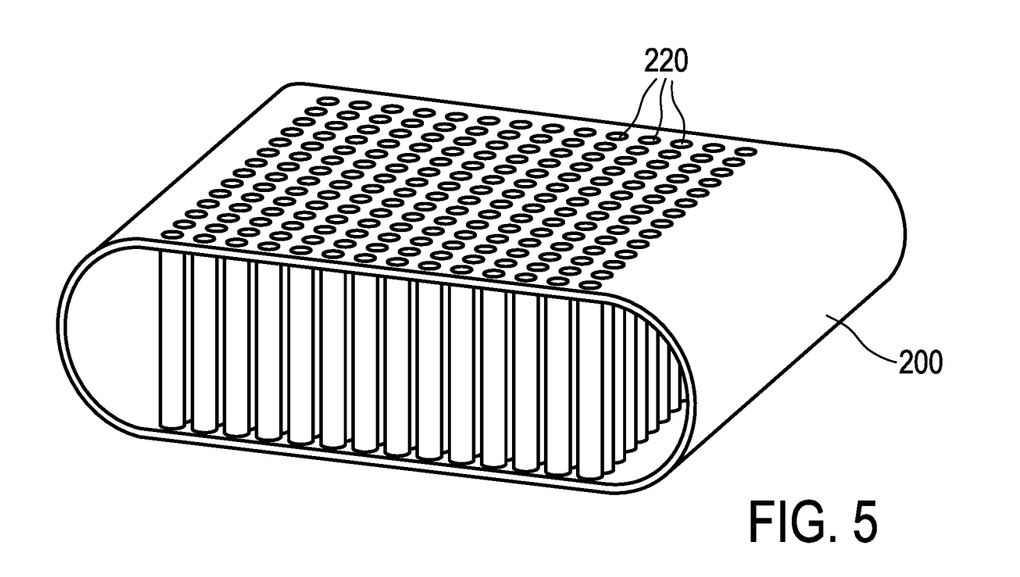
FIG. 5 shows a further core.

FIG. 5 shows a core 200 which, in contrast to that of FIG. 4, is not configured as a lost core. This means that the core 200 after the production process also remains in the finished pressure container 10. The core 200 here can in particular assume the function of a liner, i.e. the core 200 can be formed from a material which suppresses a permeation of gas such as, for example hydrogen, from the interior of the pressure container 10.

The captive core 200 also has a plurality of passages 220 which define the position and the alignment of the connections 23. As shown, the passages 220 here are in each case of a tubular configuration such that the connections 23 toward the interior space of the pressure container 10 are enclosed in the finished pressure container 10.

Figure 6:
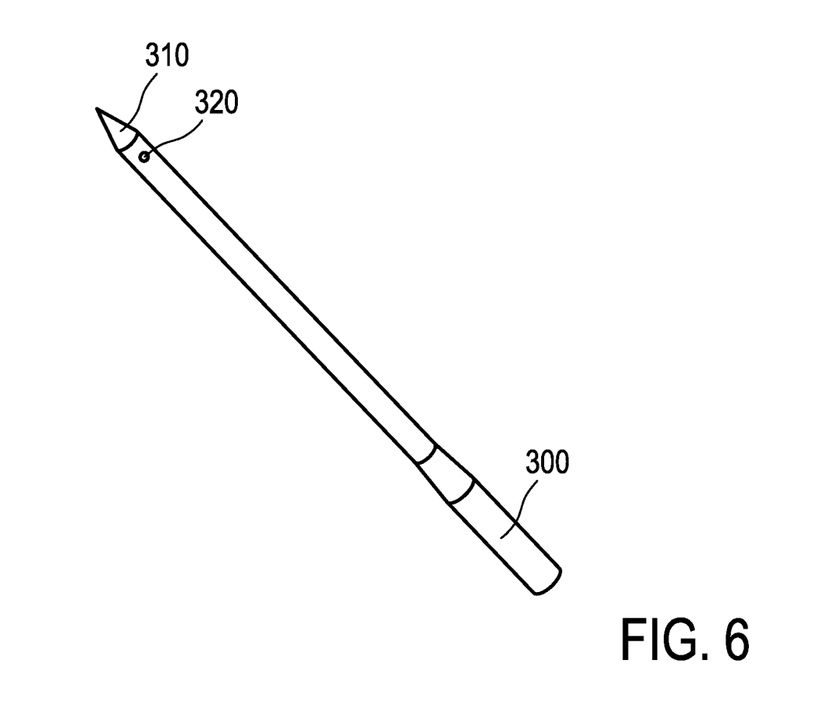
FIG. 6 shows a tufting needle.

FIG. 6 schematically shows a tufting needle 300 as can be used in the tufting process described hereunder for producing a pressure container 10. As shown, the tufting needle 300 extends along a longitudinal direction and on a longitudinal end has a tip 310. An eyelet 320 through the tufting needle 300 is formed so as to be adjacent to the tip 310. The tufting needle 300 by way of the eyelet 320 can grip a reinforcing fiber 30, to which end the reinforcing fiber 30 can pass through the eyelet. The eyelet 320, or the tufting needle 300, respectively, typically divides the reinforcing fiber 30 into a first portion 31 and a second portion 32. The location where the tip 310 grips the reinforcing fiber 30 is typically referred to as the gripping point of the reinforcing fiber 30.

Figure 7:
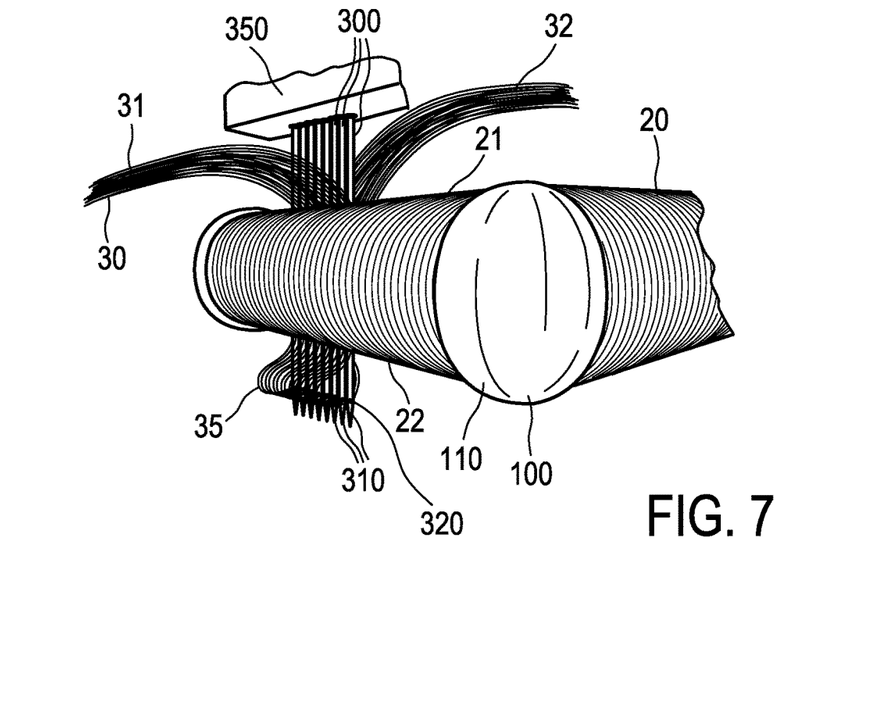
FIG. 7 shows a state during production of a pressure container.

FIG. 7 shows a typical state during production of a pressure container 10. A wall assembly 20 here has already been formed, wherein the wall assembly 20 is composed of a multiplicity of fibers which are wound about a core 100 corresponding to the embodiment of FIG. 4. A multiplicity of reinforcing fibers 30 are now pushed in parallel through this wall assembly 20, the latter having the first wall 21 thereof and the second wall 22 thereof, so as to form the connections 23 which have already been described with reference to FIG. 1.

The reinforcing fibers 30 here are fed and processed in parallel. For feeding, there is an installation which is not illustrated and which can have, for example, respective packages from which the reinforcing fibers 30 can be unwound.

A plurality of tufting needles 300 are present, wherein one tufting needle 300 is in each case present for each of the reinforcing fibers 30. The tufting needles 300 are disposed on a common mounting 350, wherein the mounting 350 can be moved and, as a result, all tufting needles 300 are simultaneously conjointly moved in parallel. As a result, it suffices for the mounting 350 to be suitably moved and guided such that all tufting needles 300 simultaneously perform the same procedure. This enables a very efficient method management.

The tips 310 of the tufting needles 300, or the eyelets 320 through which the reinforcing fibers 30 pass, respectively, divide each reinforcing fiber 30 into a respective first portion 31 and a respective second portion 32. The first portion 31 here, as shown, runs toward the left, and the second portion 32, as shown, runs toward the right. In principle, the reinforcing fibers 30, prior to forming a row of connections 23, are gripped by the tufting needles 300 above the first wall 21 in that the reinforcing fibers 30 pass through the eyelets 320. The tufting needles 300 subsequently move vertically downward, as a result first penetrating the first wall 21 and then the second wall 22. As a result, the respective reinforcing fiber 30 is likewise guided through these walls 21, 22, i.e. the reinforcing fiber 30 at the respective location runs through holes in the walls 21, 22 that are in each case formed in a self-acting manner. The reinforcing fibers 30 project from the second wall 22 on the lower side.

Loops 35, which are situated below the second wall 22, are formed by retracting the tufting needles 300 in such a manner that the tips 310 of the latter still remain below the second wall 22. The supporting element 40, which has already been explained with reference to FIG. 3, can now be pushed through these loops 35, specifically in such a manner that all loops 35 which are formed along a row R and overall are also referred to as a loop tunnel, are penetrated by this supporting element 40.

The tufting needles 300 can subsequently be moved upward again such that the tufting needles 300 are again disposed above the two walls 21, 22, thus no longer penetrating the latter. The reinforcing fibers 30 are however not entrained in the process, this meaning in particular that the reinforcing fibers 30 by way of the loops 35 thereof remain below the second wall 22, because the reinforcing fibers 30 at this location are held by the incorporated supporting element 40. When retracted, the reinforcing fibers 30 run through the eyelets 320. A deflection corresponding to the embodiment of FIG. 2 is now formed at this location. According to one potential method management, tensioning of the reinforcing fibers 30 by a tensioning device not shown can take place prior thereto, so as to tighten the loops 35 formed on the lower side. Alternatively, this can also take place in the context of the formation of the next connection.

After the procedure just described, the reinforcing fibers 30 by way of the second portion 32 thereof project toward the right. Subsequently, a further supporting element 45 according to the embodiment of FIG. 3 can in particular be placed below the second portions 32, wherein this further supporting element 45 typically likewise extends across all reinforcing fibers 30 and is aligned so as to be parallel to the supporting element 45 already mentioned on the lower side.

The tufting process can subsequently start again, specifically so as to be offset in particular in the y-direction. To this end, the tufting needles 300 on the mounting 350 thereof can, for example, be displaced by a predetermined amount in the y-direction, wherein a spacing between rows R is adjusted in this way. The reinforcing fibers 30 here remain in the eyelets 320, wherein a respective second portion 32 of a reinforcing fiber 30 becomes a new first portion 31 for the formation of the next connection 23.

When the next connection 23 is formed, the reinforcing fiber 30 is again entrained downward by the tufting needles 300, wherein the previous connection 23 is tightened. A certain tension is in particular ensured here, which ensures that the reinforcing fiber 30 bears on the supporting element 40. Likewise, a corresponding roundness on the upper side is also formed on the further supporting element 45. While the reinforcing fiber 30 is pulled downward by a respective tufting needle 300, refeeding of the reinforcing fiber 30 typically takes place from the second portion 32, for example from a roll or another infeed.

In this way, connections 23 between walls 21, 22 of a pressure container 10, which, as already mentioned, can serve for increasing the pressure resistance, can be formed very efficiently. The wall assembly 20, which has already been shown and up to this point is composed only of fibers, can then be soaked in a matrix material or impregnated or encased therewith in another way. The use of pre-impregnated fibers is likewise possible. After corresponding curing and optionally incorporating a liner 25, the pressure container 10 is typically configured so as to be gas-tight. A valve to enable controlled filling and retrieving of gas can subsequently be incorporated, for example. Alternatively, a valve can also be conjointly incorporated before or during the winding process such that the valve is conjointly wrapped.

Figure 8:
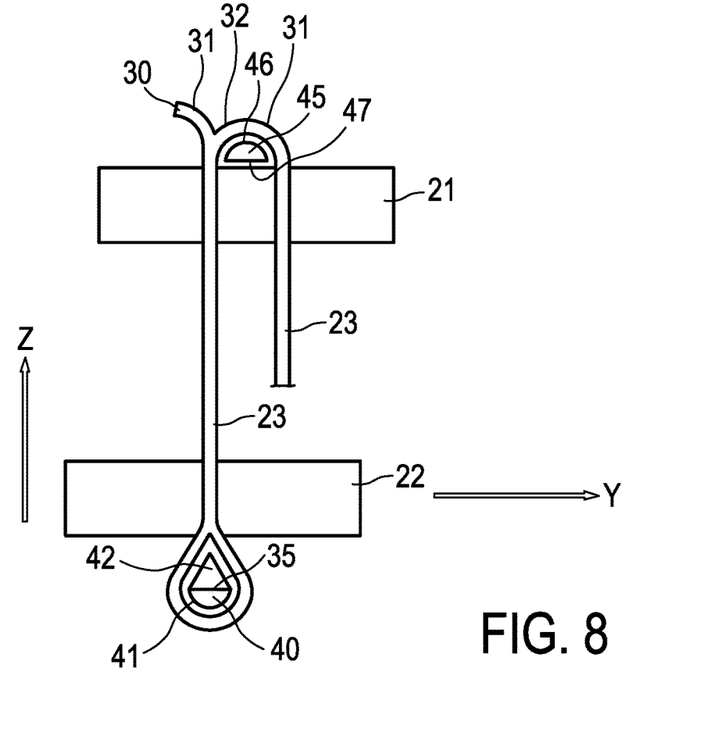
FIG. 8 shows an interaction between connections and deflections.

FIG. 8 shows the typical construction of a connection 23 between the first wall 21 and the second wall 22, having respective deflections. As already mentioned, one supporting element 40, 45, which has already been explained with reference to FIGS. 2 and 3, is in each case provided on the lower side and on the upper side here. The deflection of the reinforcing fiber 30 on the lower side takes place on a teardrop-shaped supporting element 40. The deflection on the upper side takes place on a further supporting element 45 which is semicircular in the cross section. The portions 31, 32 of the reinforcing fiber 30 at a respective connection 23 here cannot be distinguished from one another because the portions 31, 32 are cheek by jowl. Therefore, the portions 31, 32 are also not separately illustrated in FIG. 8. Proceeding from the left, a first portion 31 is first guided downward, and a second portion 32, upon deflection on the lower side, exits again at the upper first wall 21. This second portion 32, upon deflection by the supporting element 45, is guided downward again and in the process transitions to a first portion 31 of the next connection 23. As a result of this embodiment, an arbitrary number of connections 23 can practically be performed in succession using one reinforcing fiber 30, wherein only very few method steps are in each case required, and numerous connections 23 can be formed simultaneously in parallel along a row. This enables a very efficient and rapid method management, as a result of which the production costs for a pressure container 10 can be significantly reduced.

For the sake of legibility, the expression "at least one" has, in part, been omitted for the sake of simplicity. If a feature of the technology disclosed here is described in the singular or indeterminate (for example the/a pressure vessel, the/a tufting needle etc.), the disclosure is simultaneously also intended to encompass the plural thereof (for example the at least one pressure vessel, the at least one tufting needle etc.).

The above description of the present invention serves merely for illustrative purposes and not for the purposes of limiting the invention. In the context of the invention, numerous changes and modifications are possible without departing from the scope of the invention and its equivalents.

LIST OF REFERENCE SIGNS

10 Pressure container
20 Wall assembly
21 First wall
22 Second wall
23 Connection
25 Liner
30 Reinforcing fiber 31 First portion
32 Second portion
35 Loop
40 Supporting element
41 Curved deflection face
42 Acute tapered portion
45 Further supporting element
46 Further curved deflection face
47 Planar bearing face
100 Core
110 Corner
120 Passage
200 Core
220 Passage
300 Tufting needle
310 Tip
320 Eyelet
350 Mounting
R Row

The invention claimed is:

1. A method for forming connections from a reinforcing fiber, or reinforcing fibers, between walls of a wall assembly for a pressure container, the method comprising:
for forming a connection or a row of connections between a first wall and a second wall of the wall assembly, respectively repeating:
gripping each reinforcing fiber by a tufting needle at a gripping point of the reinforcing fiber from which a first portion and a second portion of the reinforcing fiber project;
penetrating the first wall with the tufting needle, then penetrating the second wall with the tufting needle such that the gripping point penetrates the first wall and the second wall, and the first portion and the second portion pass through the second wall and the first wall;
forming a loop between the gripping point and the second wall; and
incorporating a supporting element into the loop.

2. The method according to claim 1, wherein a plurality of tufting needles are moved simultaneously.

3. The method according to claim 1, wherein the reinforcing fiber, while the first and second walls are being penetrated by the tufting needle, is resupplied or unwound from a supply installation.

4. The method according to claim 1, wherein the loop is formed by retracting the tufting needle.

5. The method according to claim 4, wherein the tufting needle, when being retracted for forming the loop, is retracted only so far that the tufting needle only just penetrates the second wall.

6. The method according to claim 1, wherein only one supporting element is incorporated into all loops of a row.

7. The method according to claim 1, wherein the supporting element has a curved deflection face for deflecting the reinforcing fiber or reinforcing fibers, and/or an acute tapered portion for moving the portions to the second wall.

8. The method according to claim 1, wherein the reinforcing fiber, upon incorporation of the supporting element, is tensioned by pulling on the second portion.

9. The method according to claim 1, wherein the second portion when forming the next connection represents the first portion or transitions to the first portion.

10. The method according to claim 1, wherein a further supporting element, which bears on an outside of the first wall and deflects the reinforcing fiber or the reinforcing fibers, is incorporated between two connections of a reinforcing fiber.

11. The method according to claim 10, wherein the further supporting element has a planar bearing face for bearing on the first wall, and/or a further curved deflection face for deflecting the reinforcing fibers.

12. The method according to claim 1, wherein a core, which is subsequently removed, is in the wall assembly during performance of the method; or a core, which in the finished pressure container remains in the wall assembly, is in the wall assembly during performance of the method.

13. The method according to claim 1, wherein the connections have mutual spacings of at most 5 mm.

14. A method for producing a pressure container, the method comprising:
providing a wall assembly;
forming connections between walls of the wall assembly according to the method of claim 1; and
attaching a matrix material which surrounds the wall assembly.

15. The method according to claim 14, wherein end regions of the reinforcing fiber or of the reinforcing fibers are fastened in the matrix material.

* * * * *